United States Patent
Thein et al.

(10) Patent No.: US 11,438,804 B2
(45) Date of Patent: Sep. 6, 2022

(54) METHOD AND APPARATUS FOR OPERATING A WIRELESS COMMUNICATION NETWORK

(71) Applicant: Robert Bosch GmbH, Stuttgart (DE)

(72) Inventors: Christoph Thein, Hildesheim (DE); Hugues Narcisse Tchouankem, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 85 days.

(21) Appl. No.: 16/865,237

(22) Filed: May 1, 2020

(65) Prior Publication Data
US 2020/0359268 A1    Nov. 12, 2020

(30) Foreign Application Priority Data
May 6, 2019   (DE) .................. 10 2019 206 466.3

(51) Int. Cl.
| | |
|---|---|
| *H04W 4/00* | (2018.01) |
| *H04W 28/18* | (2009.01) |
| *H04B 17/318* | (2015.01) |
| *H04W 76/12* | (2018.01) |

(52) U.S. Cl.
CPC .......... *H04W 28/18* (2013.01); *H04B 17/318* (2015.01); *H04W 76/12* (2018.02)

(58) Field of Classification Search
CPC . G06T 19/006; G06T 7/70; G06T 7/20; G06F 3/038; H04W 4/029; H04W 4/80; H04W 4/027; H04W 4/023; H04W 4/02; H04W 4/026; H04W 4/90; H04W 64/00; H04B 17/3913
See application file for complete search history.

(56) References Cited

U.S. PATENT DOCUMENTS

| | | | |
|---|---|---|---|
| 6,272,346 B1 | 8/2001 | Fujinami | |
| 9,942,788 B1 * | 4/2018 | Zeine | H04W 24/08 |
| 2017/0064531 A1 * | 3/2017 | Stephenne | H04W 40/20 |
| 2017/0369288 A1 * | 12/2017 | Fulton | B66C 13/46 |

(Continued)

FOREIGN PATENT DOCUMENTS

| | | |
|---|---|---|
| DE | 112015007132 T5 | 9/2018 |
| EP | 1077579 A1 | 2/2001 |

(Continued)

*Primary Examiner* — Khalid W Shaheed
(74) *Attorney, Agent, or Firm* — Michael Best & Friedrich LLP

(57) ABSTRACT

A method is provided for operating a wireless communication network (4), which comprises a plurality of communication interfaces (iT1 to iT3, iAP) which are spatially separated from one another, wherein the method comprises: ascertaining (102) a first representation (R1) of a space in which the plurality of communication interfaces (iT1 to iT3, iAP) are situated at a first instant (t1), ascertaining (104) a second representation (R2) of the space in which the plurality of communication interfaces (iT1 to iT3, iAP) are expected at a future second instant (t2) following the first instant (t1), as a function of the first representation (R1) of the space, and ascertaining (106) a prediction (P) of whether or not direct line-of-sight contact exists between respective pairs of the plurality of communication interfaces (iT1 to iT3, iAP) at the second instant (t2), as a function of the second representation (R2) of the space.

9 Claims, 4 Drawing Sheets

(56) References Cited

U.S. PATENT DOCUMENTS

| | | | |
|---|---|---|---|
| 2019/0369201 A1* | 12/2019 | Akkarakaran | G01S 1/0428 |
| 2019/0373415 A1* | 12/2019 | Fairbanks | H04W 4/027 |
| 2020/0250352 A1* | 8/2020 | Wodrich | G01S 3/46 |

FOREIGN PATENT DOCUMENTS

| | | |
|---|---|---|
| JP | 2014090376 A | 5/2014 |
| WO | 9916276 A2 | 4/1999 |

* cited by examiner

METHOD AND APPARATUS FOR OPERATING A WIRELESS COMMUNICATION NETWORK

BACKGROUND OF THE INVENTION

The present invention relates to a method for operating a wireless communication network, and an apparatus for operating a wireless communication network.

It is known that the link quality between two points is carried out via measurements for the current instant.

In addition, from radio network planning, it is known to estimate link quality based on a model of an environment.

SUMMARY OF THE INVENTION

According to a first aspect of this description, a method is provided for operating a wireless communication network. The communication network comprises a plurality of communication interfaces which are spatially separated from one another. The method comprises: ascertaining a first representation of a space in which the plurality of communication interfaces are situated at a first instant, ascertaining a second representation of the space in which the plurality of communication interfaces are expected at a future second instant following the first instant, as a function of the first representation of the space, and ascertaining a prediction of whether or not direct line-of-sight contact exists between respective pairs of the plurality of communication interfaces at the second instant, as a function of the second representation of the space.

If line-of-sight contact between a pair communication interfaces should be ascertained at the second instant which is in the future, the communication should preferably take place via a corresponding radio link. A different radio link for which no line-of-sight contact exists may thus be released under some circumstances. Thus, it is possible to supplement or even to replace previous methods which, for example, exceptionally take into consideration a current measurement of the link quality. As a result, it is made possible to predict the link quality in real time.

One advantageous example is characterized in that the method comprises: providing a warning to communication partners which use a communication path which runs over at least one of the pairs of communication interfaces, as a function of the prediction.

Advantageously, all communication partners may thus be warned in a timely manner before the occurrence of a degradation in the link quality. Thus, a reaction time is also created which at least one of the communication partners can use to put the communication and/or a subsystem into a safe state. For example, a maximum speed of a mobile industrial robot can be reduced upon receipt of the warning.

One advantageous example is characterized in that the method comprises: configuring at least a portion of the plurality of communication interfaces as a function of the prediction.

Advantageously, it is thus possible to preferably set up radio links between at least two of the plurality of communication interfaces between which line-of-sight contact exists.

One advantageous example is characterized in that the method comprises: ascertaining the first representation of the space and/or the second representation of the space as a function of sensor data which are provided by a sensor at least partially observing the space.

Advantageously, the information which, for example, represents the actual positions of the respective communication interface, is enhanced or first provided by the sensor data. Thus, information is obtained by adding the sensor data.

One advantageous example is characterized in that the method comprises: ascertaining a plurality of radio-active objects and their respective position in the first and/or second representation of the space, as a function of the sensor data, linking the ascertained radio-active objects to at least one of the plurality of communication interfaces, and ascertaining the positions of the plurality of communication interfaces as a function of the respectively associated position of the radio-active object which is linked to the respective communication interface.

Advantageously, by means of the proposed data fusion, the position ascertainment is improved for the communication interface.

One advantageous example is characterized in that the method comprises: ascertaining a plurality of passive objects which respectively comprise none of the communication interfaces and which are part of the first and/or second representation of the space, and their position in the first and/or second representation of the space as a function of the sensor data.

One advantageous example is characterized in that the method comprises: ascertaining signal attenuations expected at the second instant, of the existing and/or possible radio links between at least two of the plurality of communication interfaces, as a function of the ascertained positions of the plurality of radio-active objects at the second instant, and/or as a function of the ascertained positions of the plurality of radio-passive objects at the second instant, wherein the signal attenuations are part of the prediction.

Advantageously, the expected signal attenuation of the radio link is used as a quality criterion in order in particular to improve the aforementioned configuration of the communication interfaces.

One advantageous example is characterized in that the method comprises: configuring at least a portion of the plurality of communication interfaces as a function of the ascertained signal attenuations of the existing or possible radio links.

Advantageously, it is thereby, for example, possible to preferably set up radio links between at least two of the plurality of communication interfaces, between which line-of-sight contact exists and a line-of-sight radio link is possible having negligible or reduced signal attenuation.

One advantageous example is characterized in that the method comprises: associating at least one of a plurality of attenuation ratios with a respective one of the plurality of radio-passive objects and/or radio-active objects, as a function of the sensor data, and ascertaining the expected signal attenuation of the existing or possible radio link between two communication interfaces at the second instant, as a function of at least one of the ascertained attenuation ratios.

Thus, for example, a higher attenuation ratio is associated with an optically highly reflective surface. Correspondingly, a high signal attenuation results for a radio link if this object is situated between the communication interfaces of a radio link at the second instant, or extends into a Fresnel zone in the case of direct line-of-sight contact. Advantageously, the associated attenuation ratios may thereby result in an optimized configuration of the communication network if the radio links having the lowest of the expected signal attenuations are always chosen.

One advantageous example is characterized in that the method comprises: ascertaining the first representation of the space and/or the second representation of the space as a function of monitoring the radio channels which are used and are usable for wireless communication by means of the plurality of communication interfaces.

Irrespective of whether the radio channels are physical or logical, the actual position and/or the estimated future position of the communication interfaces may be ascertained by means of the provided monitoring, without additional hardware necessarily having to be provided for this purpose. Rather, use may be made of the existing hardware.

A second aspect of this description relates to an apparatus for operating a wireless communication network which comprises a plurality of communication interfaces which are spatially separated from one another, wherein the apparatus comprises at least one processor and at least one memory having computer program code, wherein the computer program code is configured in such a way that, via the at least one processor, it causes the apparatus to ascertain a first representation of a space in which the plurality of communication interfaces are situated at a first instant, to ascertain a second representation of the space in which the plurality of communication interfaces are expected at a future second instant following the first instant, as a function of the first representation of the space, and to ascertain a prediction of whether or not direct line-of-sight contact exists between respective pairs of the plurality of communication interfaces at the second instant, as a function of the second representation of the space.

DETAILED DESCRIPTION

Figure 1:
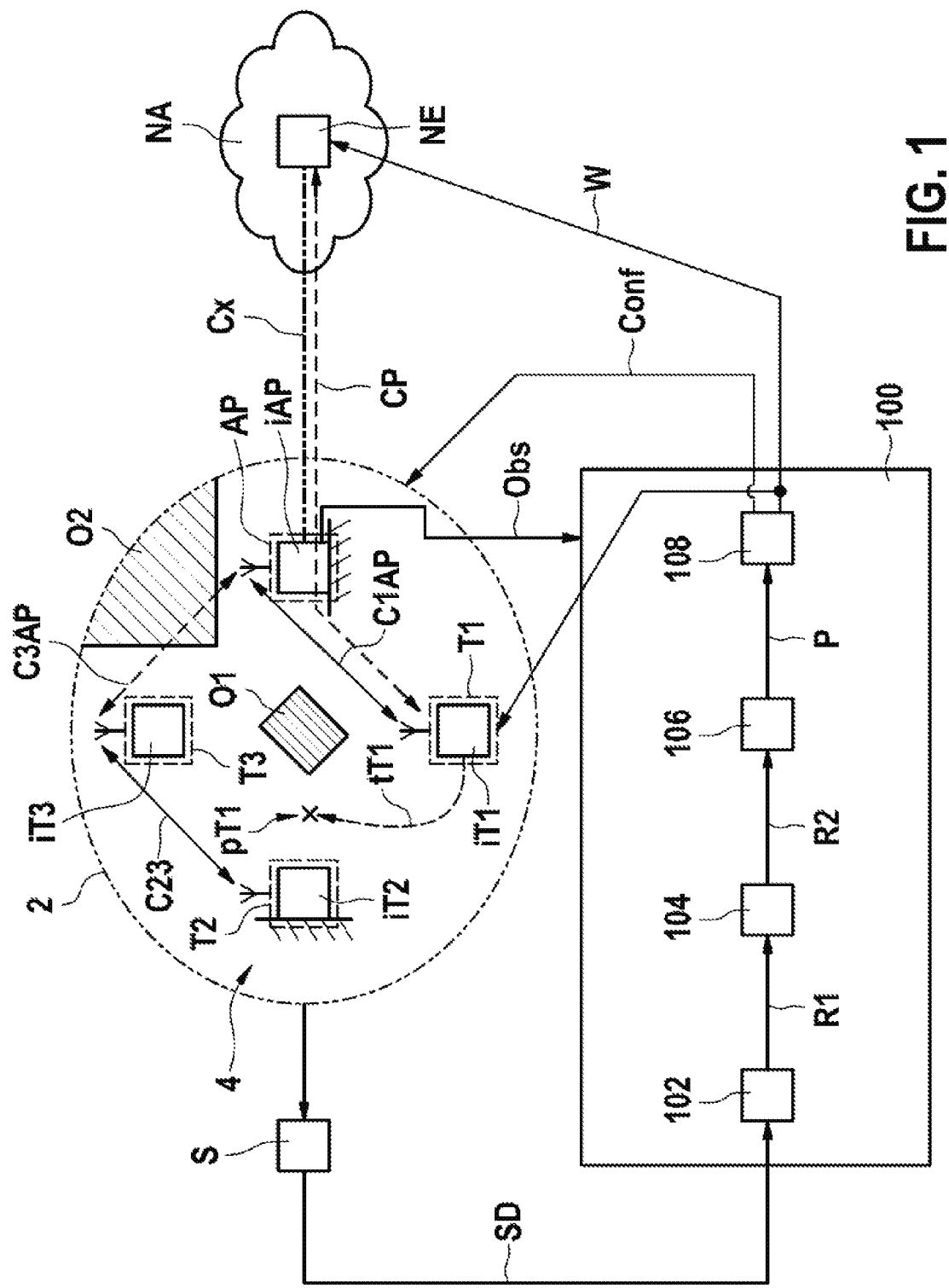
FIG. 1: a schematic diagram with an exemplary setting of a space.

FIG. 1 depicts a schematic diagram with an exemplary setting 2 of a space in which a wireless a wireless communication network 4 is operated. The wireless communication network 4 comprises, for example, a number of mobile terminal devices T1, T3 and/or fixed terminals such as the terminal device T2. In addition, the communication network 4 comprises an access point AP.

The terminal devices T1 to T3 and the access point AP respectively comprise at least one communication interface iT1 to iT3 and iAP. The communication interfaces iT1 to iT3 are, for example, configured to set up a radio link with one another, for example, the radio link C23. The communication interface iAP provides access to another network area NA. Thus, a radio link C1AP is set up, for example, between the communication interface iAP and the communication interface iT1. The access point AP thus provides the terminal devices T1 to T3 with the possibility of communicating with a distant network unit NE via a communication path CP. In this case, the communication path CP comprises the radio link C1AP and at least one additional link Cx between the access point AP and the distant network unit NE. The network unit NE is, for example, not a part of the communication network 4, but is arranged in another network area NA of a respective enterprise with which the communication network 4 is also associated, or in a long-distance network.

In addition to the terminal devices T1 to T3 and the at least one access point AP, which constitute radio-active objects, the setting 2 comprises further radio-passive objects O1 and O2, which influence the radio traffic between the terminal devices T1 to T3 and the access point AP. In the depicted example, the radio link C1AP is not obscured by one of the passive objects O1 and O2. The radio link C1AP is, for example, less affected by signal attenuation than a radio link C3AP between the communication interfaces iT3 and iAP, since the communication interfaces iT1 and iAP have line-of-sight contact, i.e., there is a virtual straight-line link between the communication modules iT1 and iAP which is not directly obscured by radio-passive or radio-active objects. In the case of the radio link C3AP, increased signal attenuation must be expected with respect to the radio link C1AB.

If the mobile terminal device T1 with the associated communication module iT1 moves along a trajectory tT1 starting at a first instant, it arrives at a position pT1 at a second, future instant and is shadowed from the line of sight of the access point AP by the passive object O1. In other words, at the second instant, the communication modules iT1 and iAP have no line-of-sight contact. Thus, increased signal attenuation for the radio link C1AP must be assumed at the second instant. In another example, it is likewise conceivable that one of the mobile terminal devices is situated between the first terminal device T1 and the access point AP at the second instant.

The setting 2 or the associated space is detected at least in part by at least one sensor S, of which sensor data SD are supplied to an apparatus 100. The sensor S is, for example, a video camera, a radar sensor, a lidar sensor, or an ultrasonic sensor. Of course, a plurality of sensors, also of different types, may monitor the setting. The apparatus 100 comprises at least one processor and one memory on which a computer program is stored. When executing the computer program on the processor, the method steps described in this description are carried out.

A block 102 ascertains a first representation R1 of the space in which the plurality of communication interfaces iT1 to iT3 and iAP are situated at the first instant, as a function of the sensor data SD. A block 104 ascertains a second representation R2 of the space at the second instant, which is in the future with respect to the first instant, as a function of the first representation R1. The first instant is, for example, a present instant, whereby the first representation R1 of the space depicts an actual state of the setting 2. As a result, the second representation R2 is a prediction of the setting 2 at the second instant.

A block 106 ascertains a prediction P as a function of the second representation R2. The prediction P comprises a piece of information about whether or not direct line-of-sight contact exists between respective pairs of the plurality of communication interfaces iT1 to iT3 and iAP. A block 108 ascertains a warning W and/or a configuration Conf.

By means of the first and second representations R1, R2 of the space, a model of the environment and the objects situated therein is provided, for example, based on video data, and the line-of-sight link and the distance between two points are calculated. By adding the prediction of the trajectory of the objects, an estimate of the link quality between two points is carried out for the second instant in the future.

The setting analysis takes place by means of the block 102, and the estimation of the movement of the objects takes place by means of the block 104. The block 102 ascertains the position of the objects by means of image processing or other sensor data processing. Based on the model of the environment in the context of the second representation R2, the line-of-sight link between the expected positions of the at least two communication interfaces is determined either by means of ray tracing or by means of other methods. In addition, from the current movements of the objects, their position at an instant in the future, in particular at the second instant, is estimated, whereby a prediction of the line-of-sight contact between two points in space results.

The warning W is, for example, ascertained if a degradation of the radio channel C1AP is expected at the second instant, for example, if the terminal device T1 is expected at the position pT1 at the second instant. In particular, the warning W is ascertained if, starting from the first instant in which line-of-sight contact exists between two communication interfaces, line-of-sight contact no longer exists between the two communication interfaces at the second instant. The warning W is transmitted to the communication partners, for example, to the terminal device T1 and the network unit NE, of the communication path CP.

The configuration Conf is ascertained if a degradation is expected i.e., for example, the line-of-sight contact is lost, for one of the possible radio channels at the second instant. The communication is, for example, routed over radio channels which are to be newly set up and which have a lower expected signal attenuation at the second instant than the existing radio link at the second instant. For example, the moving terminal device changes before the occurrence of the second instant to a radio link to an access point other than the access point AP, which is not depicted. The configuration Conf is, for example, distributed via the access point AP to the terminal devices T1 to T3. In another example, only the access points AP of the infrastructure are reconfigured. The communication interfaces iT1 to iT3 and iAP are then partially or all reconfigured before or at the occurrence of the second instant. This reconfiguration comprises, for example, releasing and setting up radio channels, increasing or decreasing the reception strength and/or transmission strength, changing frequency bands, changing modulation and coding schemes, etc.

The access point AP or its communication interface iAP allows observing the used and unused radio changes or the overall radio traffic in the communication network 4. The radio observation Obs is transmitted to the apparatus 100 and is used for ascertaining the first or second representation. The apparatus 100 ascertains, for example, by means of triangulation, the current positions of the communication interfaces iT1 to iT3 as a function of the radio observation Obs, whereby the first and second representations of the space can be ascertained. Of course, the positions of the communication interfaces iT1 to iT3 may also be ascertained via an upstream unit or one of the access points AP and provided to the apparatus 100.

Figure 2:
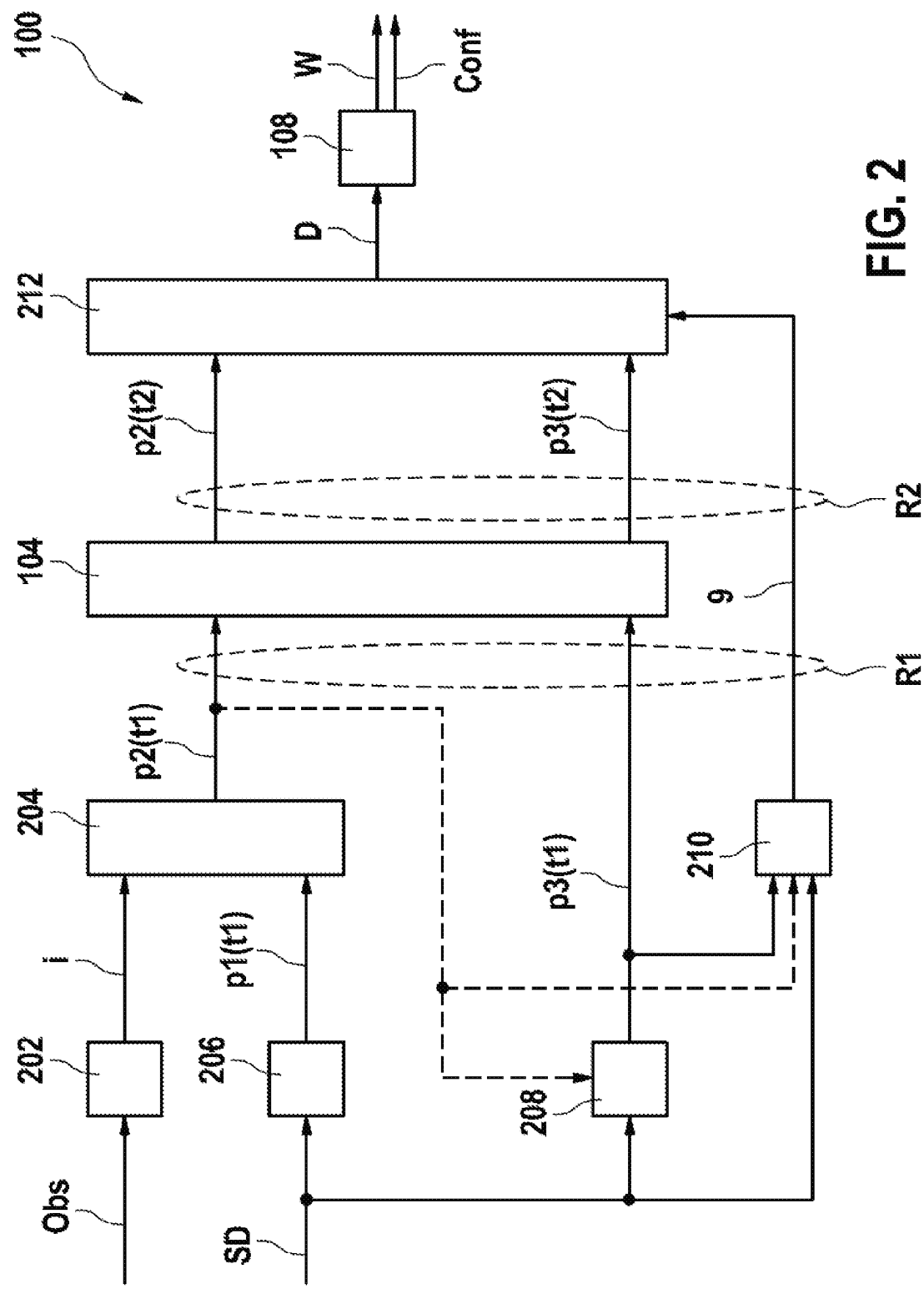
FIG. 2: a schematic block diagram.

FIG. 2 depicts a schematic block diagram of the apparatus 100. A block 202 ascertains a plurality of communication interfaces or corresponding data objects as a function of the radio observation Obs, and provides a corresponding piece of information i to a block 204. The piece of information i also comprises, for example, positions of the respective communication interfaces. Alternatively or in addition, the communication interfaces estimate their position themselves and provide them to the block 204. In this example, the respective communication interface localizes itself autonomously, for example, by means of a GPS receiver and a received GPS signal, and transmits the position and movement data to a data storage device, where said data are provided for calculation and prediction.

A block 206 ascertains positions p1(t1) of radio-active objects, for example, the terminal devices T1 to T3 and the access point AP from FIG. 1 at the first instant t1, i.e., at a present instant. The block 204 links the radio-active objects or their position p1(t1) to a respective one of the plurality of communication interfaces which are provided by means of the piece of information i. By means of the linking, positions p2(t1) of the plurality of communication interfaces are ascertained and provided as a function of the respectively associated position p1(t1) of the radio-active object which is linked to the respective communication interface.

According to one block 208, a plurality of passive objects, which respectively comprise none of the communication interfaces, and their respective present position p3(t1) at the first instant t1, are ascertained. In addition, the positions p2(t1), which represent the positions of the communication interfaces, may be used in order to ascertain the positions p3(t1) of the radio-passive objects. Thus, for example, in step 208, positions of all objects depicted in the sensor data SD are ascertained. Subsequently, the positions p2(t1) of the radio-active objects are compared to the position of all detected objects in order to provide the label "radio-active" to the objects in the sensor data SD of which the position matches a respective position p2(t1). The subsequently remaining objects are provided with the "radio-passive" label. In this way, the block 208 ascertains, for example, the positions p3(t1) of the radio-passive objects at the first instant t1.

A link between a respective communication interface and an object is provided to the blocks 202, 204, and 206 in a data storage device. This link is achieved, for example, via an identifier which the respective object carries on a license plate. Thus, it is possible to determine the position of the communication interface based on the position determination of the associated object.

A block 210 ascertains a plurality of attenuation ratios g as a function of the positions p3(t1) and/or p2(t1) and as a function of the sensor data SD. Thus, for example, surfaces are detected by means of the sensor data SD, and their effect on a radio link, in particular the respective attenuation ratio g, is estimated. The positions p2(t1), p3(t1) and the attenuation ratios g constitute the representation R1 of the space at the first instant t1.

The block 104 constitutes an estimator which ascertains a plurality of positions p2(t2) of the communication interfaces or the radio-active objects and a plurality of positions p3(t2) of the radio-passive objects, as a function of the respective position p2(t1) and p3(t1) and under some circumstances, as a function of chronologically earlier respective positions p2 and p3. Thus, the second representation R2 is available at the second instant.

A block 212 ascertains signal attenuations D expected at the second instant t2, of the existing or possible radio links between at least two of the plurality of communication interfaces, as a function of the plurality of positions p2(t2) of the communication interfaces or the radio-active objects and the plurality of positions p3(t2) of the radio-passive objects. The block 212 takes into consideration the positions of the radio-passive and radio-active objects during the ascertainment of the signal attenuations D, wherein, for example, in the case of line-of-sight contact between two communication interfaces, it does not yet mean that a line-of sight radio link is possible having low attenuation. For ascertaining the presence of the line-of-sight radio link at the second instant t2, it is ascertained whether a radio-passive or radio-active object extends into a Fresnel zone, in particular the first Fresnel zone, between the two communication interfaces of the respective possible or existing radio link, at the second instant. If this is not the case, low attenuation D is ascertained for the respective radio link at the second instant. In one example, the radio link is characterized as a line-of-sight radio link.

Thus, in the opposite case, there is thus absolutely no line-of-sight contact between two communication interfaces of one of the radio links possible at the second instant; the block 212 ascertains the attenuation D by taking into consideration the wave propagation. Thus, a path loss and channel impulse response are estimated for the respective radio link between two communication interfaces at the second instant. It is thereby possible to ascertain the overall attenuation D of the radio link. As a result, the ascertained attenuations D of the radio links possible at the second instant comprise the piece of information about whether or not direct line-of-sight contact exists between respective pairs of the plurality of communication interfaces at the second instant.

The communication interfaces in this description comprise a respective antenna, of which the position determines whether a line-of-sight link or line-of-sight contact exists with other antennas b of another of the communication interfaces.

Figure 3:
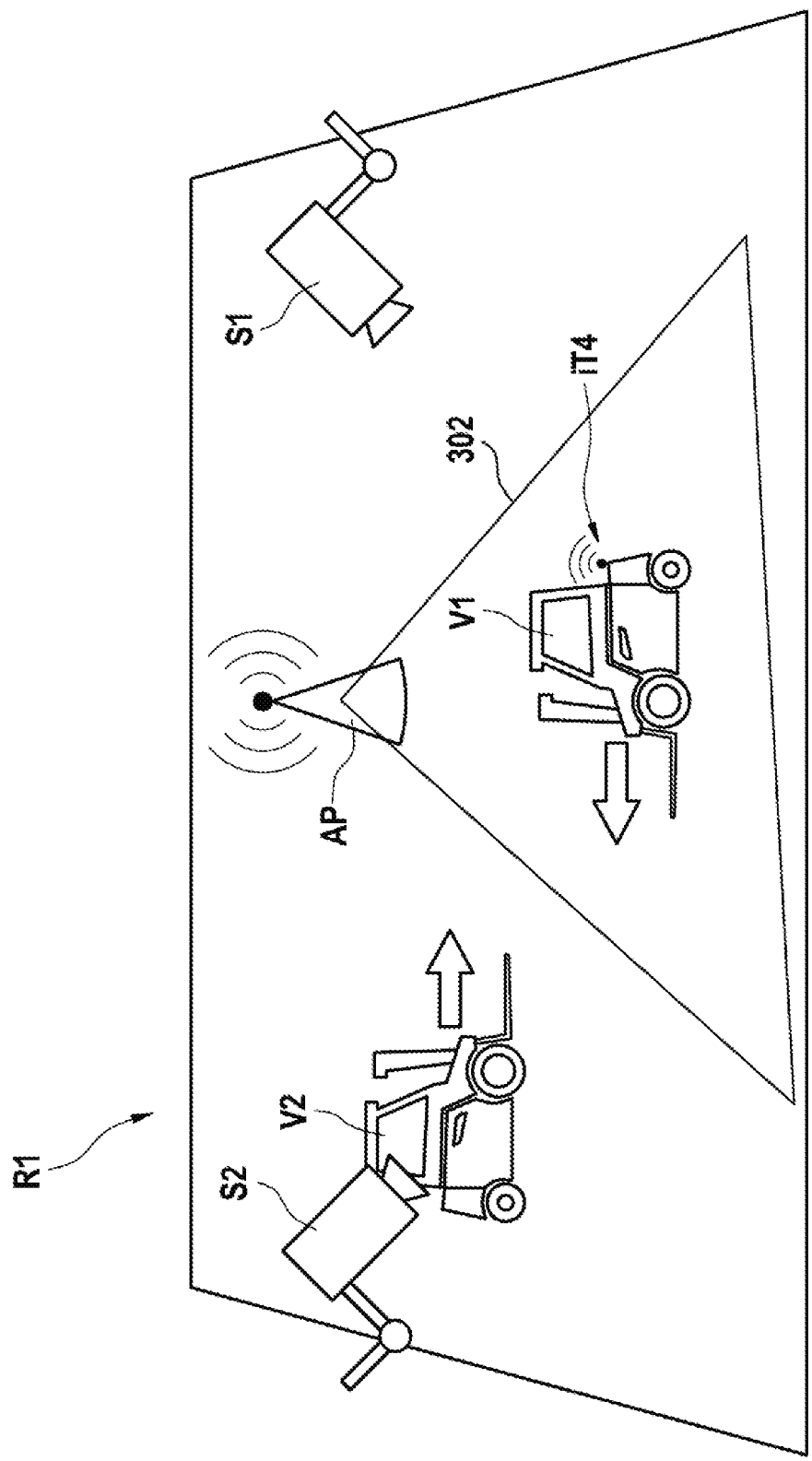
FIGS. 3 and 4: respective representations of a space.

FIG. 3 shows, by way of example, the first representation R1 of the space, which is monitored by two sensors S1 and S2, at the first instant. The access point AP provides a possible line-of-sight link with a communication interface iT4 of a vehicle V1 in an area 302. At the first instant, a second vehicle V2 approaches the area 302.

Figure 4:
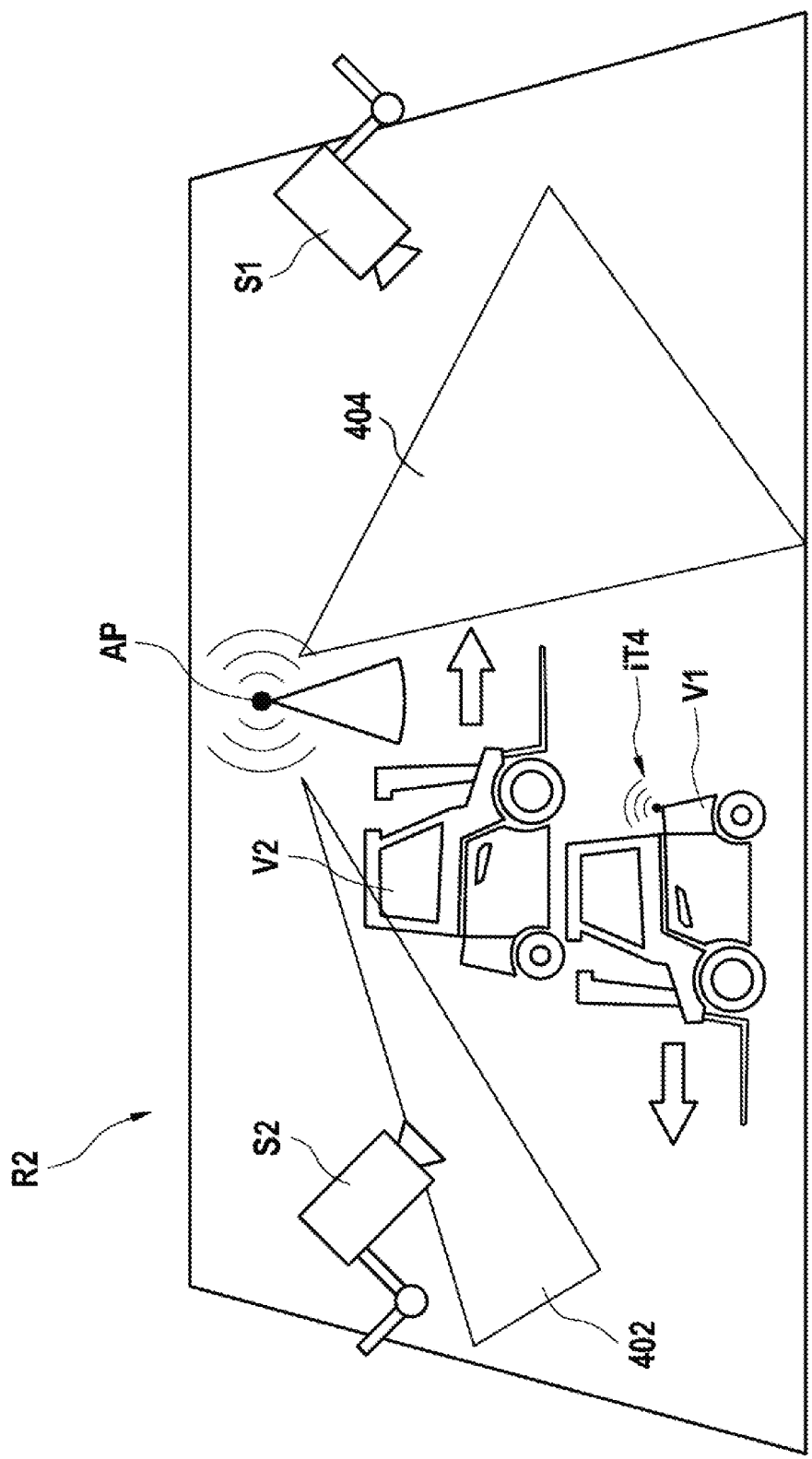

FIG. 4 depicts, by way of example, the second representation R2 of the space at the second instant, wherein the second representation R2 was ascertained as a function of the first representation R1. At the second instant, it is estimated that the second vehicle V2 is situated between the access point AP and the communication interface iT4 of the vehicle V1. The vehicle V2 thus shadows the communication interface iT4 in such a way that the communication interface iT4 is no longer situated in one of the areas 402 and 404 in which the access point AP provides a line-of-sight link.

The invention claimed is:

1. A method for operating a wireless communication network (4) which comprises a plurality of communication interfaces (iT1 to iT3, iAP) which are spatially separated from one another, wherein the method comprises:
   ascertaining (102) a first representation (R1) of a space in which the plurality of communication interfaces (iT1 to iT3, iAP) are situated at a first instant (t1),
   ascertaining (104) a second representation (R2) of the space in which the plurality of communication interfaces (iT1 to iT3, iAP) are expected at a future second instant (t2) following the first instant (t1), as a function of the first representation (R1) of the space,
   ascertaining (106) a prediction (P) of whether or not direct line-of-sight contact exists between respective pairs of the plurality of communication interfaces (iT1 to iT3, iAP) at the second instant (t2), as a function of the second representation (R2) of the space, wherein the prediction (P) includes an estimate of a link quality between the respective pairs of the plurality of communication interfaces (iT1 to iT3, iAP) at the second instant (t2) based at least in part on the direct line-of-sight contact,
   ascertaining the first representation (R1) of the space, the second representation (R2) of the space, or both the first representation (R1) of the space and the second representation (R2) of the space as a function of sensor data (SD) which are provided by a sensor (S) at least partially observing the space,
   ascertaining signal attenuations (D) expected at the second instant (t2), of the existing radio links, possible radio links, or both existing and possible radio links between at least two of the plurality of communication interfaces (iT1 to iT3, iAP), as a function of (a) ascertained positions of a plurality of radio-active objects at the second instant (t2), as a function of (b) ascertained positions of a plurality of radio-passive objects at the second instant (t2) or as a function of both (a) and (b), wherein the signal attenuations (SD) are part of the prediction (P),
   associating at least one of a plurality of attenuation ratios (g) with a respective one of the plurality of radio-passive objects, the plurality of radio-active objects, or both the radio-passive objects and the plurality of radio-active objects, as a function of the sensor data (SD), and
   ascertaining the expected signal attenuation (D) of the existing or possible radio link between two communication interfaces (iT1 to iT3, iAP) at the second instant (t2), as a function of at least one of the ascertained attenuation ratios (g).

2. The method according to claim 1, wherein the method comprises
   providing a warning (W) to communication partners (T1, NE) which use a communication path (CP) which runs over at least one of the pairs of communication interfaces (iT1 to iT3, iAP), as a function of the prediction (P).

3. The method according to claim 1, wherein the method comprises:
   configuring at least a portion of the plurality of communication interfaces (iT1 to iT3, iAP) as a function of the prediction (P).

4. The method according to claim 1, wherein the method comprises:
   ascertaining the plurality of radio-active objects and their respective position in the first representation, in the second representation, or both the first and the second representations (R1; R2) of the space, as a function of the sensor data (SD),
   linking the ascertained radio-active objects to at least one of the plurality of communication interfaces (iT1 to iT3, iAP), and
   ascertaining the positions of the plurality of communication interfaces (iT1 to iT3, iAP) as a function of the respectively associated position of the radio-active object which is linked to the respective communication interface (iT1 to iT3, iAP).

5. The method according to claim 1, wherein the method comprises:
   ascertaining the plurality of passive objects which respectively comprise none of the communication interfaces (iT1 to iT3, iAP) and which are part of the first, the second, of both the first and second representations (R1; R2) of the space, and their respective position in the first, the second, or both the first and second representations (R1; R2) of the space, as a function of the sensor data (SD).

6. The method according to claim 1, wherein the method comprises:
configuring a least a portion of the plurality of communication interfaces (iT1 to iT3, iAP) as a function of the ascertained signal attenuations (D) of the existing or possible radio links.

7. A method for operating a wireless communication network (4) which comprises a plurality of communication interfaces (iT1 to iT3, iAP) which are spatially separated from one other, wherein the method comprises:
ascertaining (102) a first representation (R1) of a space in which the plurality of communication interfaces (iT1 to iT3, iAP) are situated at a first instant (t1),
ascertaining (104) a second representation (R2) of the space in which the plurality of communication interfaces (iT1 to iT3, iAP) are expected at a future second instant (t2) following the first instant (t1), as a function of the first representation (R1) of the space,
ascertaining (106) a prediction (P) of whether or not direct line-of-sight contact exists between respective pairs of the plurality of communication interfaces (iT1 to iT3, iAP) at the second instant (t2), as a function of the second representation (R2) of the space,
ascertaining the first representation (R1) of the space, the second representation (R2) of the space, or both the first representation (R1) of the space and the second representation (R2) of the space as a function of sensor data (SD) which are provided by a sensor (S) at least partially observing the space,
ascertaining signal attenuations (D) expected at the second instant (t2), of the existing radio links, possible radio links, or both existing and possible radio links between at least two of the plurality of communication interfaces (iT1 to iT3, iAP), as a function of (a) ascertained positions of a plurality of radio-active objects at the second instant (t2), as a function of (b) ascertained positions of a plurality of radio-passive objects at the second instant (t2) or as a function of both (a) and (b), wherein the signal attenuations (SD) are part of the prediction (P),
associating at least one of a plurality of attenuation ratios (g) with a respective one of the plurality of radio-passive objects, the plurality of radio-active objects, or both the radio-passive objects and the plurality of radio-active objects, as a function of the sensor data (SD), and
ascertaining the expected signal attenuation (D) of the existing or possible radio link between two communication interfaces (iT1 to iT3, iAP) at the second instant (t2), as a function of at least one of the ascertained attenuation ratios (g).

8. The method according to claim 1, wherein the method comprises:
ascertaining the first representation of the space (R1), the second representation of the space (R2), or both the first representation of the space (R1) and the second representation of the space (R2) as a function of monitoring (Obs) the radio channels which are used and are usable for wireless communication by means of the plurality of communication interfaces (iT1 to iT3, iAP).

9. An apparatus (100) for operating a wireless communication network (4), which comprises a plurality of communication interfaces (iT1 to iT3, iAP) which are spatially separated from one another, wherein the apparatus (100) comprises at least one processor and at least one memory having computer program code, wherein the computer program code is configured in such a way that, via the at least one processor, it causes the apparatus (100)
to ascertain a first representation (R1) of a space in which the plurality of communication interfaces (iT1 to iT3, iAP) are situated at a first instant (t1),
to ascertain a second representation (R2) of the space in which the plurality of communication interfaces (iT1 to iT3, iAP) are expected at a future second instant (t2) following the first instant (t1), as a function of the first representation (R1) of the space, and
to ascertain a prediction (P) of whether or not direct line-of-sight contact exists between respective pairs of the plurality of communication interfaces (iT1 to iT3, iAP) at the second instant (t2), as a function of the second representation (R2) of the space, wherein the prediction (P) includes an estimate of a link quality between the respective pairs of the plurality of communication interfaces (iT1 to iT3, iAP) at the second instant (t2) based at least in part on the direct line-of-sight contact,
ascertaining the first representation (R1) of the space, the second representation (R2) of the space, or both the first representation (R1) of the space and the second representation (R2) of the space as a function of sensor data (SD) which are provided by a sensor (S) at least partially observing the space,
ascertaining signal attenuations (D) expected at the second instant (t2), of the existing radio links, possible radio links, or both existing and possible radio links between at least two of the plurality of communication interfaces (iT1 to iT3, iAP), as a function of (a) ascertained positions of a plurality of radio-active objects at the second instant (t2), as a function of (b) ascertained positions of a plurality of radio-passive objects at the second instant (t2) or as a function of both (a) and (b), wherein the signal attenuations (SD) are part of the prediction (P),
associating at least one of a plurality of attenuation ratios (g) with a respective one of the plurality of radio-passive objects, the plurality of radio-active objects, or both the radio-passive objects and the plurality of radio-active objects, as a function of the sensor data (SD), and
ascertaining the expected signal attenuation (D) of the existing or possible radio link between two communication interfaces (iT1 to iT3, iAP) at the second instant (t2), as a function of at least one of the ascertained attenuation ratios (g).

* * * * *